United States Patent
Kumar et al.

(10) Patent No.: US 7,565,519 B1
(45) Date of Patent: Jul. 21, 2009

(54) SYSTEM AND METHOD FOR AUTOMATICALLY UPGRADING/REVERTING CONFIGURATIONS ACROSS A PLURALITY OF PRODUCT RELEASE LINES

(75) Inventors: Ravindra Kumar, Bangalore (IN); Jonathan Mark Crowther, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 482 days.

(21) Appl. No.: 11/388,106

(22) Filed: Mar. 23, 2006

(51) Int. Cl.
*G06F 9/00* (2006.01)
*G06F 9/44* (2006.01)
*G06F 9/445* (2006.01)

(52) U.S. Cl. .............................. 713/1; 713/2; 713/100; 717/168; 717/170

(58) Field of Classification Search .................... 713/1, 713/2, 100; 717/168, 170
See application file for complete search history.

(56) References Cited

U.S. PATENT DOCUMENTS

| | | | |
|---|---|---|---|
| 5,819,292 A | 10/1998 | Hitz et al. | |
| 6,643,654 B1 | 11/2003 | Patel et al. | |
| 7,206,970 B1 * | 4/2007 | Lauterbach et al. | 714/36 |
| 2004/0030668 A1 | 2/2004 | Pawlowski et al. | |
| 2005/0192932 A1 | 9/2005 | Kazar et al. | |
| 2006/0168572 A1 * | 7/2006 | Backlund et al. | 717/137 |

OTHER PUBLICATIONS

David A Patterson et al.; A Case of Redundant Arrays of Inexpensive Disks (RAID); Computer Science Division, Department of Electrical Engineering and Computer Sciences; University of California, Berkeley, CA; pp. 109-116.

* cited by examiner

*Primary Examiner*—Thomas Lee
*Assistant Examiner*—Michael J Brown
(74) *Attorney, Agent, or Firm*—Cesari and McKenna LLP

(57) ABSTRACT

A system and method for automatically upgrading/reverting of the software configurations in a storage system environment among a plurality of product release lines. A configuration upgrade/revert module of a storage system management module identifies a shortest path between an initial configuration and a desired end configuration using a transition table comprising of a plurality of transition functions. The upgrade/revert configuration module invokes the appropriate series of transition functions to modify the software configuration from the initial state to the desired end state.

20 Claims, 7 Drawing Sheets

| FROM/TO | VERSION X.Y | VERSION X.Y+1 | VERSION X+1.Y | VERSION X.Y+2 | VERSION X+1.Y+1 | VERSION X+2.Y | ... |
|---|---|---|---|---|---|---|---|
| VERSION X.Y | - | tr(X.Y->X.Y+1) | tr(X.Y->X+1.Y) | tr(X.Y->X.Y+2) | tr(X.Y->X+1.Y+1) | tr(X.Y->X+2.Y) | ⋮ |
| VERSION X.Y+1 | tr(X.Y+1->X.Y) | - | tr(X.Y+1->X+1.Y) | tr(X.Y+1->X.Y+2) | tr(X.Y+1->X+1.Y+1) | tr(X.Y+1->X+2.Y) | ⋮ |
| VERSION X+1.Y | tr(X+1.Y->X.Y) | tr(X+1.Y->X.Y+1) | - | tr(X+1.Y->X.Y+2) | tr(X+1.Y->X+1.Y+1) | tr(X+1.Y->X+2.Y) | ⋮ |
| VERSION X.Y+2 | tr(X.Y+2->X.Y) | tr(X.Y+2->X.Y+1) | tr(X.Y+2->X+1.Y) | - | tr(X.Y+2->X+1.Y+1) | tr(X.Y+2->X+2.Y) | ⋮ |
| VERSION X+1.Y+1 | tr(X+1.Y+1->X.Y) | tr(X+1.Y+1->X.Y+1) | tr(X+1.Y+1->X+1.Y) | tr(X+1.Y+1->X.Y+2) | - | tr(X+1.Y+1->X+2.Y) | ⋮ |
| VERSION X+2.Y | tr(X+2.Y+1->X.Y) | tr(X+2.Y->X.Y+1) | tr(X+2.Y->X+1.Y) | tr(X+2.Y->X.Y+2) | tr(X+2.Y->X+1.Y+1) | - | ⋮ |
| ... | ... | ... | ... | ... | ... | ... | |

FIG. 6

SYSTEM AND METHOD FOR AUTOMATICALLY UPGRADING/REVERTING CONFIGURATIONS ACROSS A PLURALITY OF PRODUCT RELEASE LINES

FIELD OF THE INVENTION

The present invention relates to configuration management and, more specifically, to upgrading/reverting configurations across a plurality of product release lines.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage system architecture environments including, but not limited to, a network-attached storage (NAS) environment, a storage area network (SAN) and a disk assembly is directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

In addition to implementing the file system, the storage operating system may implement the functionality of a volume manager and/or other data redundancy features typically in connection with one or more versions (releases) of the system. As storage system providers introduce new versions of storage operating systems, administrators may need to upgrade various storage systems under their control. This process includes both upgrading the storage operating system software as well as the configuration information so that the storage system configuration is compatible with each new version of the storage operating system. Additionally, administrators may desire to revert to a previous version of a storage operating system for a variety of reasons including, for example, backward compatibility; i.e., to ensure that cooperating storage systems execute the same version of software, particularly when one of the storage systems may not support the newer version of the storage operating system.

When a storage operating system, or any software, has a single product release line, supporting the upgrade/reversion of the configuration is relatively straightforward and linear. For example, to upgrade from version X to version X+3, the administrator first upgrades to version X+1 and then from version X+1 to version X+2 and finally from version X+2 to version X+3. However, a noted disadvantage of storage operating system or other software upgrades/reversions occurs when the software is available in multiple product release lines. An example of multiple release lines is a software product having a base version X.Y and two (or more) lines such as X+1.Y and X.Y+1. Thus, a base version may be version 5.0, whereas the two differing release lines may be 6.0 and 5.1. Clearly, the conventional linear upgrade/revert process is not operative when supporting upgrade/reversion among such multiple product release lines.

SUMMARY OF THE INVENTION

The present invention overcomes the disadvantages of the prior art by providing a system and method for automatically upgrading/reverting software configurations in a storage system environment across a plurality of product release lines. A storage system management module executing within the storage system environment manages an upgrade/revert procedure to enable automatic upgrade/reversion operations of the software configurations. To that end, a configuration upgrade/revert (configuration) module of the storage system management module utilizes a transition table to perform the operations, including constructing potential upgrade/revert transition paths between the product release lines.

In accordance with the novel upgrade/revert procedure, an administrator first upgrades/reverts the actual software before activating the configuration module. The software may be upgraded/reverted using any acceptable software installation technique. Once activated, the configuration module determines if a direct configuration transition is possible between a starting release version and a desired ending release version. If such a direct transition is possible, the configuration module invokes a transition function stored within the transition table. The transition table illustratively comprises a data structure embodying a set of transition information structures that contain information required to perform the transition operations, e.g., identification of (i) the changes between the release versions, (ii) the transition function to perform the transition and (iii) the cost to perform the transition. The cost parameter represents the cost of a given direct transition and is useful for calculating the shortest path for a given transition. The cost may illustratively reflect the complexity of an operation or the time required to perform an operation. It should be noted that the cost is not limited to only the complexity and/or time and as such the cost parameter should be taken as exemplary only. This parameter can be used to change the dynamics of the transitions performed using the present invention. In some environments, a dynamic nature may not be required and static transition paths may be preferred. For such static preferred cases, a constant value may be used as the cost for all transitions. Transition tables are typically distributed with new versions of the software so that the administrator may perform the proper upgrade/revert.

However, if a direct configuration transition is not possible between the starting and ending release versions, the configuration module attempts to find a shortest path between versions and constructs a transition path. The transition path is constructed by viewing the transition table as a graph and utilizing a shortest path algorithm to identify the shortest path between the starting and ending versions, and thereafter performing each individual upgrade/revert transition operation serially.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 6 is a schematic block diagram of an exemplary transition table in accordance with an embodiment of the present invention.

DETAILED DESCRIPTION OF AN ILLUSTRATIVE EMBODIMENT

A. Storage System Environment

Figure 1:
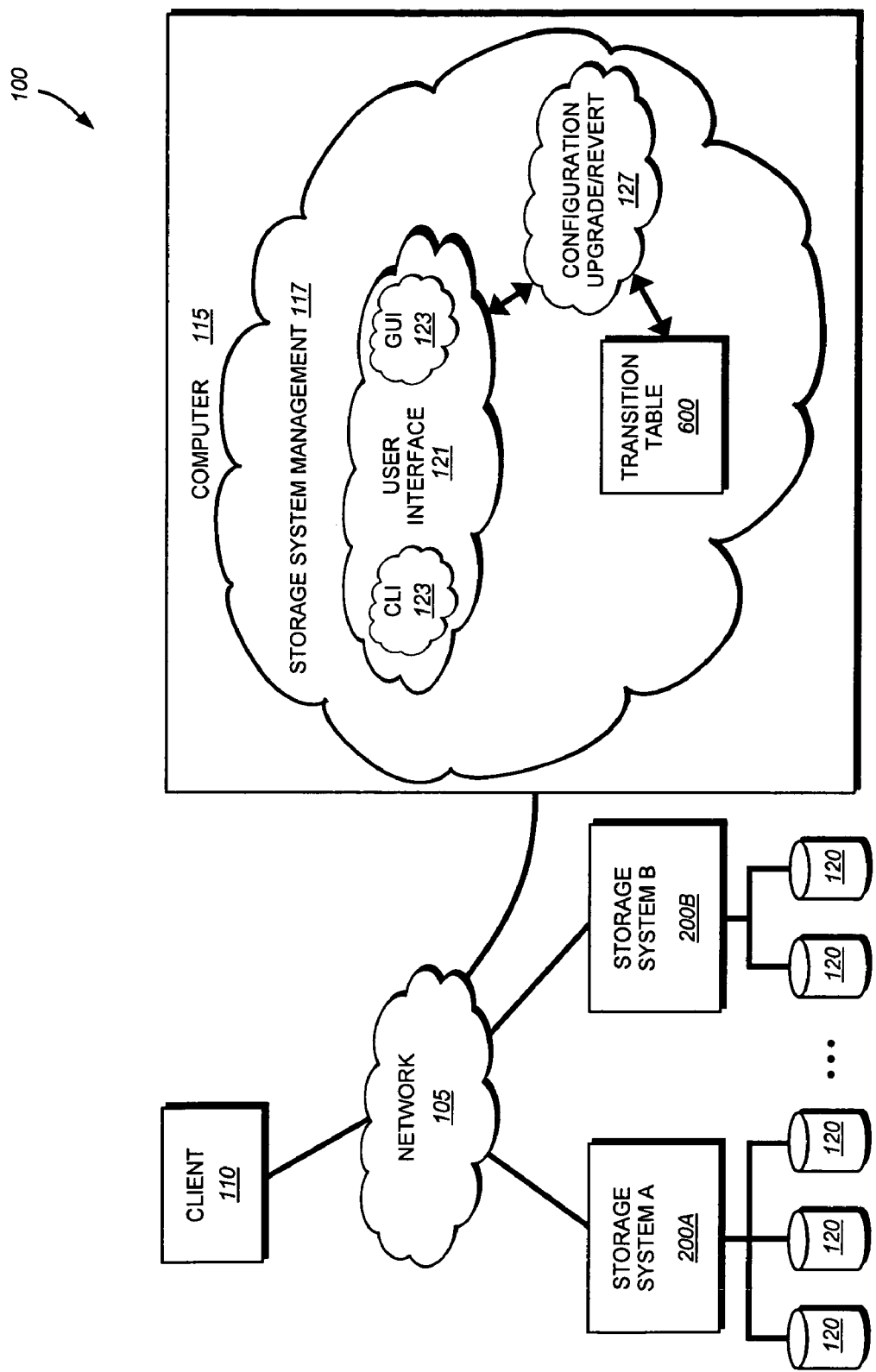
FIG. 1 is a schematic block diagram of an exemplary network storage system environment showing a storage system management module in accordance with an embodiment of the present invention.

FIG. 1 is a schematic block diagram of an exemplary storage system environment 100 in accordance with an embodiment of the present invention. The storage system environment 100 comprises a plurality of storage systems 200A, B operatively interconnected with one or more storage devices 120, such as disks. A network 105 connects the storage systems 200 to one or more clients 110, as well as to a computer 115 executing a storage system management (SSM) module 117 in accordance with an illustrative embodiment of the present invention.

The SSM 117 comprises a plurality of modules including a user interface (UI) module 121 that includes a command line interface (CLI) 123 and/or a graphical user interface (GUI) 125. A configuration upgrade/revert (configuration) module 127 permits automatic upgrading/reversion of software configurations, as described further below. The configuration module 127 utilizes a transition table 600, also described further below, which contains information required to perform a transition between two versions of software configurations. However, in alternate embodiments, the functionality of the SSM may be integrated with a storage system 200 or, more particularly, a storage operating system executing on the storage system. As such, the description of the SSM 117 executing on a separate computer 115 within the storage system environment should be taken as exemplary only. It should be noted that the teachings of the present invention may be utilized in a cluster environment. An exemplary cluster environment is described in U.S. patent application Ser. No. 11/119,278, entitled STORAGE SYSTEM ARCHITECTURE FOR STRIPING DATA CONTAINER CONTENT ACROSS VOLUMES OF A CLUSTER, by Michael Kazar, et al. In such cluster environments, a central mechanism may be utilized to implement the principles of the present invention across all nodes of the cluster.

B. Storage System

Figure 2:
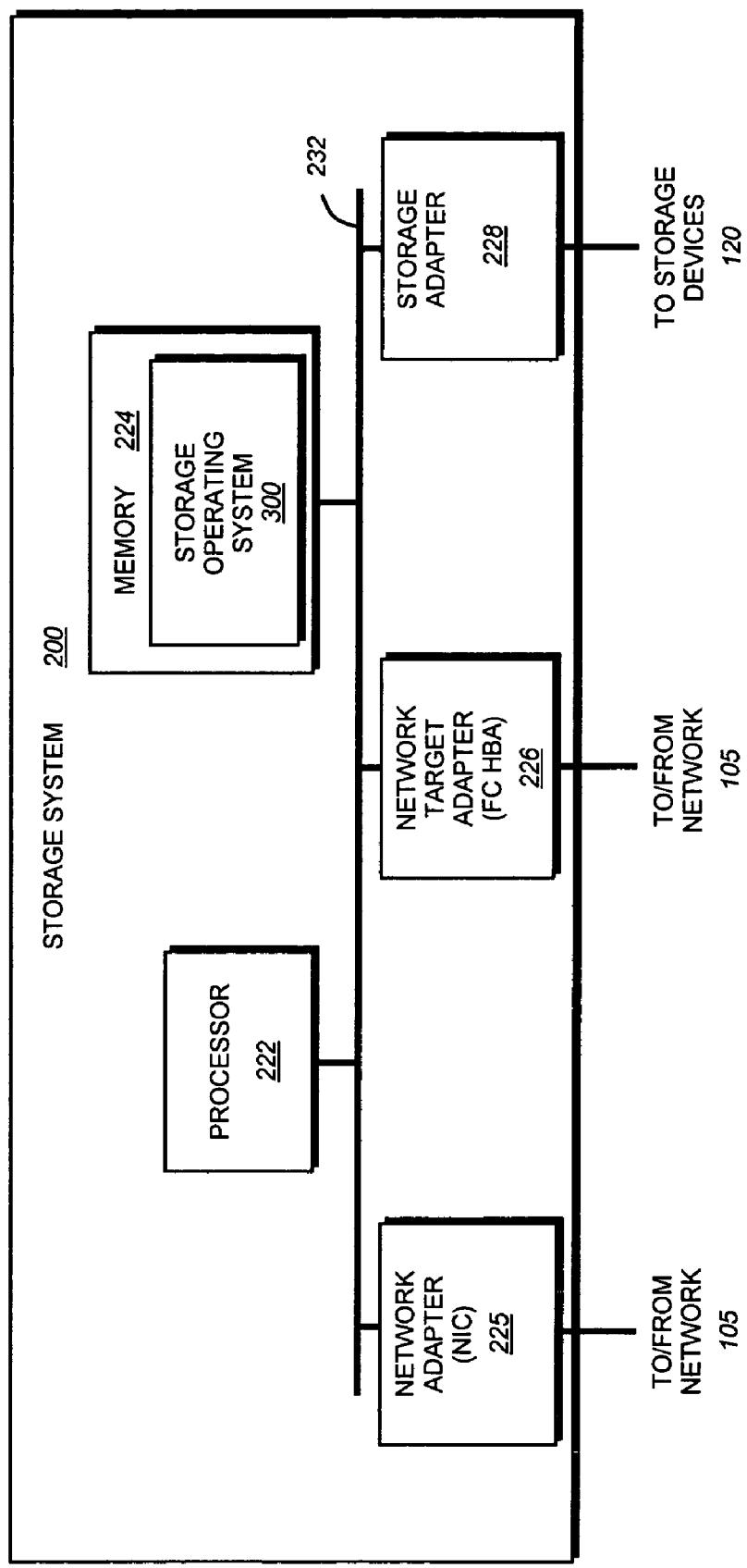
FIG. 2 is a schematic block diagram of an exemplary storage system in accordance with an embodiment of the present invention.

FIG. 2 is a schematic block diagram of an illustrative storage system 200 that may be advantageously used with the present invention. The storage system is configured to provide storage service for both file and block protocol access to information stored on storage devices in an integrated manner. In this context, the storage system denotes a computer having features such as simplicity of storage service management and ease of storage reconfiguration, including reusable storage space, for users (system administrators) and clients of network attached storage (NAS) and storage area network (SAN) deployments.

Illustratively, the storage system 200 is embodied as a storage appliance comprising a processor 222, a memory 224, a plurality of network adapters 225, 226 and a storage adapter 228 interconnected by a system bus 232. The storage system

200 also includes a storage operating system 300 that provides a virtualization system (and, in particular, a file system) to logically organize the information as a hierarchical structure of named directory, file and virtual disk (vdisk) storage objects on storage devices, such as disks.

The clients of a SAN-based network environment have a storage viewpoint of blocks or disks. To that end, the storage system 200 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The storage system thereafter makes these emulated disks accessible to the SAN clients through controlled exports.

In the illustrative embodiment, the memory 224 comprises storage locations that are addressable by the processor and adapters for storing software program code and data structures associated with the present invention. A portion of memory 224 may be organized as a "buffer cache" for storing data structures for use by the storage operating system during runtime operation. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 225 may comprise a network interface controller (NIC) that is couples the storage appliance to a plurality of clients over point-to-point links, wide area networks, virtual private networks implemented over a public network (Internet) or a shared local area network. The NIC comprises the mechanical, electrical and signaling circuitry needed to connect the appliance to a network.

The storage network "target" adapter 226 also couples the storage appliance to clients that may be further configured to access the stored information as blocks or disks. The network target adapter 226 may comprise a FC host bus adapter (HBA) having the mechanical, electrical and signaling circuitry needed to connect the appliance to a SAN network switch. In addition to providing FC access, the FC HBA may offload fibre channel network processing operations for the storage appliance.

The storage adapter 228 cooperates with the storage operating system 300 executing on the storage appliance to access information requested by the clients. The information may be stored on disks or other similar media adapted to store information. The storage adapter includes I/O interface circuitry that couples to the disks 120 over an I/O interconnect arrangement, such as a conventional high-performance, FC serial link topology. The information is retrieved by the storage adapter and, if necessary, processed by the processor 222 (or the adapter 228 itself) prior to being forwarded over the system bus 232 to the network adapters 225, 226, where the information is formatted into packets or messages and returned to the clients.

Storage of information on the storage system 200 is preferably implemented as one or more storage volumes that comprise a cluster of physical storage disks 120, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

One or more virtual disks (vdisks) may be stored within each volume. A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within the file system of the storage system. As used herein, a set of stream inodes denotes one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section. An example of a stream inode object that may be advantageously used with the present invention is described in U.S. Pat. No. 6,643,654 titled SYSTEM AND METHOD FOR REPRESENTING NAMED DATA STREAMS WITHIN AN ON-DISK STRUCTURE OF A FILE SYSTEM, by Kayuri Patel et al., which is hereby incorporated by reference as though fully set forth herein.

B. Storage Operating System

To facilitate access to the disks, the storage operating system 300 implements a write-anywhere file system that cooperates with virtualization modules to provide a function that "virtualizes" the storage space provided by disks. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architecture environments including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
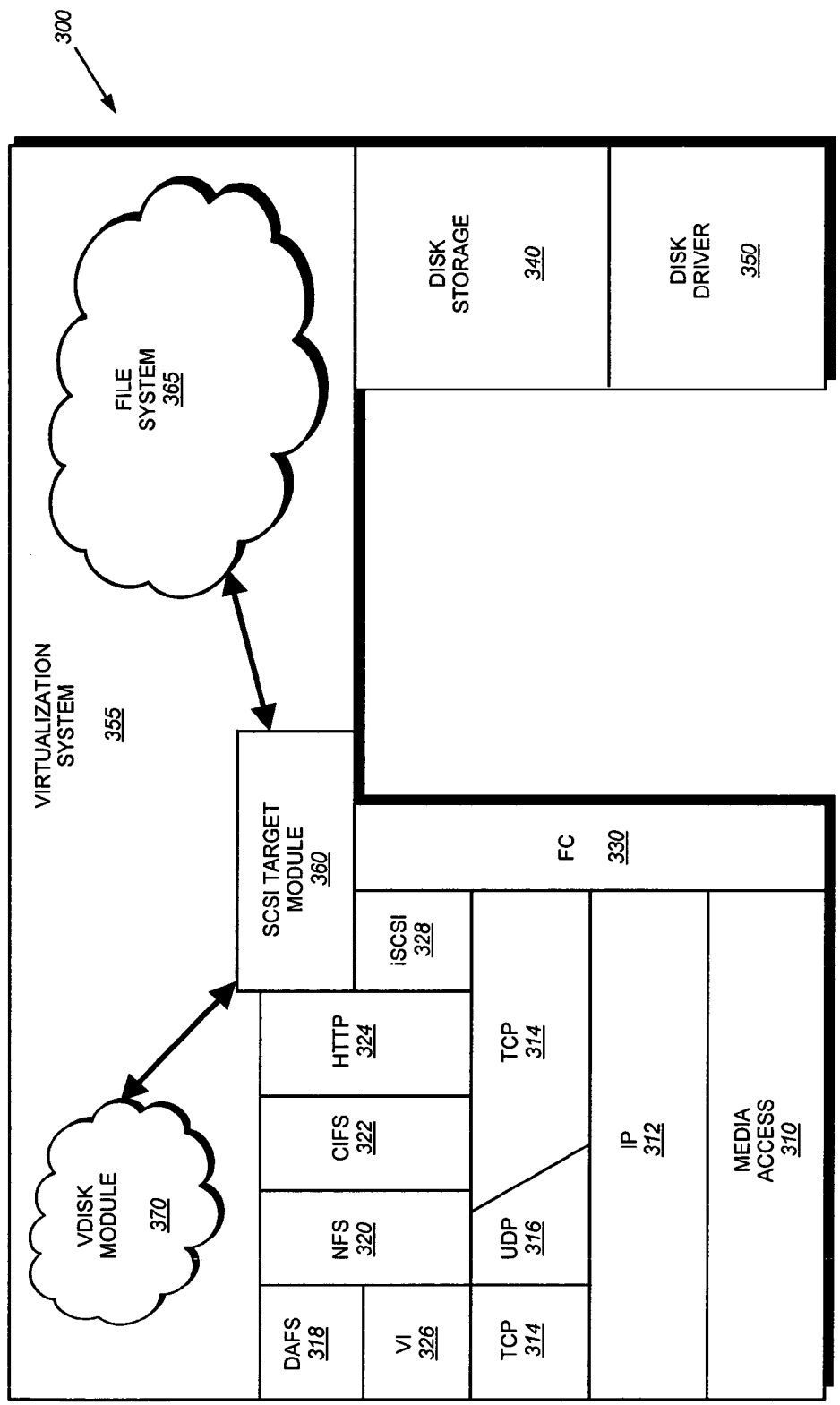
FIG. 3 is a schematic block diagram of an exemplary storage operating system for use on a storage system in accordance with an embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the DAFS protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 operates with the FC HBA 226 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 355 that is implemented by a file system 365 interacting with virtualization modules illustratively embodied as, e.g., vdisk module 370 and SCSI target module 360. It should be noted that the vdisk module 370, the file system 365 and SCSI target module 360 can be implemented in software, hardware, firmware, or a combination thereof. The vdisk module 370 interacts with the file system 365 to enable access by administrative interfaces in response to a system administrator issuing commands to the multi-protocol storage appliance. In essence, the vdisk module 370 manages SAN deployments by, among other things, implementing a comprehensive set of vdisk (lun) commands issued through a user interface by a system administrator. These vdisk commands are converted to primitive file system operations ("primitives") that interact with the file system 365 and the SCSI target module 360 to implement the vdisks.

The SCSI target module 360, in turn, initiates emulation of a disk or lun by providing a mapping procedure that translates luns into the special vdisk file types. The SCSI target module is illustratively disposed between the FC and iSCSI drivers 330, 328 and the file system 365 to thereby provide a translation layer of the virtualization system 355 between the SAN block (lun) space and the file system space, where luns are represented as vdisks. By "disposing" SAN virtualization over the file system 365, the multi-protocol storage appliance reverses the approaches taken by prior systems to thereby provide a single unified storage platform for essentially all storage access protocols.

The file system 365 is illustratively a message-based system; as such, the SCSI target module 360 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 360 passes the message into the file system 365 as, e.g., a function call, where the operation is performed.

The file system 365 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by Hitz, et al. dated Oct. 6, 1998, the contents of which are hereby incorporated by reference.

Operationally, a request from the client 110 is forwarded as a packet over the computer network 105 and onto the storage system 200 where it is received at the network adapter 225, 226. A network driver processes the packet and, if appropriate, passes it on to a network protocol and file access layer for additional processing prior to forwarding to the write-anywhere file system 365. Here, the file system generates operations to load (retrieve) the requested data from disk 120 if it is not resident "in-core," i.e., in the buffer cache. If the information is not in the cache, the file system 365 indexes into the inode file using the inode number to access an appropriate entry and retrieve a logical volume block number (vbn). The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk 120 and loads the requested data block(s) in buffer cache for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 200 in response to a request issued by client 110. Moreover, in another alternate embodiment of the invention, the processing elements of adapters 225, 226, may be configured to offload some or all of the packet processing and storage access operations, respectively, from processor 222, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage appliance) or general-purpose computer, including a standalone computer or portion thereof, embodied as or including a storage system 200. An example of a storage appliance that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, by Brian Pawlowski et al., filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

E. File System Organization

Figure 4:
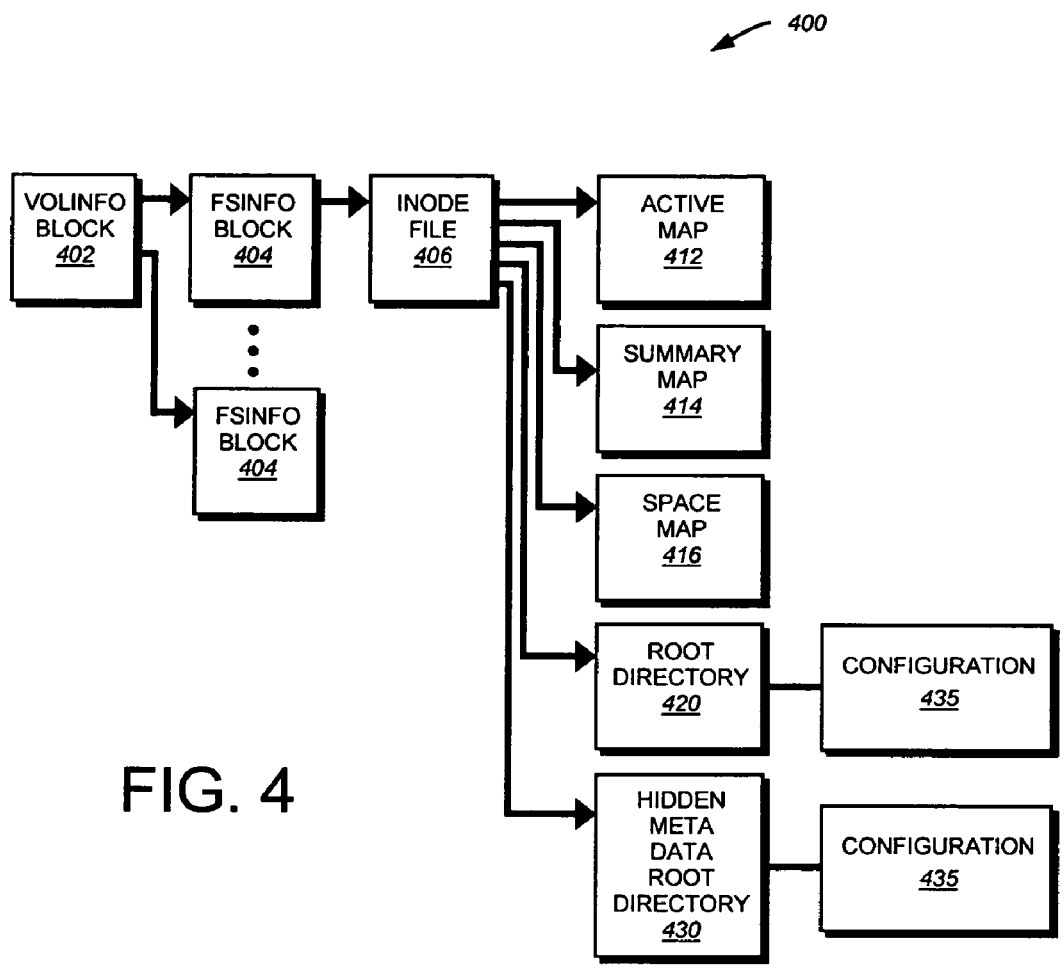
FIG. 4 is a schematic block diagram of an on-disk representation of a volume associated with an exemplary file system in accordance with an embodiment of the present invention.

FIG. 4 is a schematic block diagram of an on-disk representation of a volume 400 associated with the file system 365. The storage operating system 300, e.g., the RAID system 340, assembles a physical volume of pvbns to create the volume 400, with pvbns 1 and 2 comprising a "physical" volinfo block 402 for the volume. The volinfo block 402 contains block pointers to fsinfo blocks 404, each of which may represent a snapshot of the volume. Each fsinfo block 404 includes a block pointer to an inode file 406 that contains inodes of a plurality of files, including an active map 412, a summary map 414 and a space map 416, as well as other special meta-data files. The inode file 406 further includes a root directory 420 and a "hidden" meta-data root directory 430. The active map 412, summary map 414 and space map 416 are utilized by the file system 365 to track which blocks are currently utilized by which data containers within the file system.

The volume 400 also includes one or more software configuration file(s) 435 related to software executing on the storage system. The configuration files 435 for software may be stored in a plurality of locations including, for example, within the root directory 420. Alternately, the configuration files 435 may be stored within the hidden metadata root directory 430. The configuration files 435 are illustratively text files that store currently set options for the software. It should be noted that in alternate embodiments, the configuration files may be of a differing format than text files and/or may be stored in other areas of the file system.

F. Upgrading/Reverting Configurations

The present invention provides a system and method for automatically upgrading/reverting software configurations in a storage system environment across a plurality of product release lines. A storage system management module executing within the storage system environment manages an upgrade/revert procedure to enable automatic upgrade/reversion operations of the software configurations. To that end, a configuration upgrade/revert (configuration) module of the storage system management module utilizes a transition table to perform the operations, including constructing potential upgrade/revert transition paths between the product release lines.

In accordance with the novel upgrade/revert procedure, an administrator first upgrades/reverts the actual software before activating the configuration module. The software may be upgraded/reverted using any acceptable software installation technique, such as conventional wizard based installation managers commonly utilized with Microsoft Windows based software. Once activated, the configuration module determines if a direct configuration transition is possible between a starting release version and a desired ending release version. If such a direct transition is possible, the configuration module invokes a transition function stored within the transition table. The transition table illustratively comprises a data structure embodying a set of transition information structures that contain information required to perform the transition operations, e.g., identification of (i) the changes between the release versions, (ii) the transition function to perform the transition and (iii) the cost to perform the transition. The cost parameter represents the cost of a given direct transition and is useful for calculating the shortest path for a given transition. The cost may illustratively reflect the complexity of an operation or the time required to perform an operation. It should be noted that the cost is not limited to only the complexity and/or time and as such the cost parameter should be taken as exemplary only. This parameter can be used to change the dynamics of the transitions performed using the present invention. In some environments, a dynamic nature may not be required and static transition paths may be preferred. For such static preferred cases, a constant value may be used as the cost for all transitions. Transition tables are typically distributed with new versions of the software so that the administrator may perform the proper upgrade/revert.

However, if a direct configuration transition is not possible between the starting and ending release versions, the configuration module attempts to find a shortest path between versions and constructs a transition path. The transition path is constructed by viewing the transition table as a graph and utilizing a shortest path algorithm to identify the shortest path between the starting and ending versions, and thereafter performing each individual upgrade/revert transition operation serially.

Figure 5:
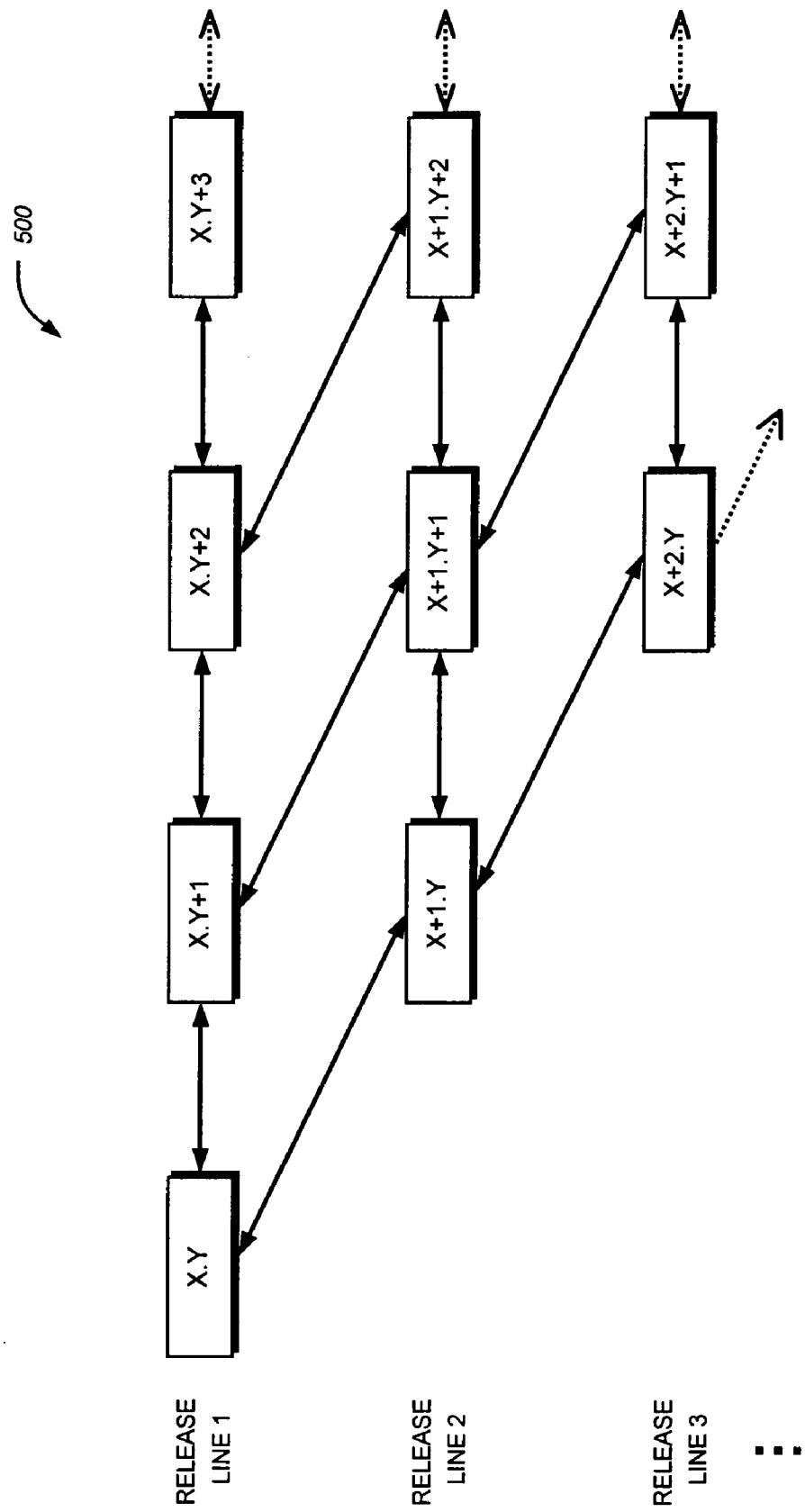
FIG. 5 is a schematic block diagram of an exemplary release graph in accordance with an embodiment of the present invention.

FIG. 5 is a schematic block diagram showing an exemplary product release line graph 500 showing a plurality of product release lines. A first release line begins with an initial product release X.Y. A second release line begins with X+1.Y, while a third release line begins with X+2.Y. Each of these release lines may have incremental changes with a new individual product release, designated by increments to the second number within the product release designation. Thus, release X.Y may be upgraded (software and configuration) to release X.Y+1 within the same release line. From release X.Y+1, the software and configuration may be upgraded within the same release line to X.Y+2 or maybe upgraded from release line one to release line two by upgrading to X+1.Y+1. As can be appreciated, when dealing with a plurality of release lines there may not be a direct transition between any two particular versions. For example, assume that a current storage system is utilizing release X+1.Y and the administrator desires to implement release X.Y+2. There is no direct transition between the two releases. As such, the teachings of the present invention may be utilized to find an optimal upgrading/reverting path to enable, e.g., the configurations to be updated.

FIG. 6 is a schematic block diagram of an exemplary transition table 600 in accordance with an embodiment of the present invention. The transition table is illustratively data structure embodied as an N×N matrix where N is the total number of product releases among which upgrade/revert is to be supported. The transition table contains a set of transition information structures designated by tr(transition), wherein the transition identifies the starting and ending release versions of each transition, e.g., X.Y→X.Y+1. Each transition information function contains information required to perform one or more transition operations described above. Illustratively, the transition information structure includes (i) identification of the changes between the two release versions, (ii) a transition function to perform the transition and (iii) the cost to perform the transition. The cost parameter represents the cost of a given direct transition and is useful for calculating the shortest path for a given transition. The cost may illustratively reflect the complexity of an operation or the time required to perform an operation. It should be noted that the cost is not limited to only the complexity and/or time and as such the cost parameter should be taken as exemplary only. This parameter can be used to change the dynamics of the transitions performed using the present invention. In some environments, a dynamic nature may not be required and static transition paths may be preferred. For such static preferred cases, a constant value may be used as the cost for all transitions.

In alternate embodiments, additional and/or differing information may be included in the transition information structure. The transition function may be invoked by the configuration module to transition between any two storage system versions. It should be noted that certain transitions are not supported, e.g., because there are no operations required to transition a particular release to itself. Additionally, it should be noted that in certain embodiments the transition function may not enable a direct configuration transition but may instead require one or more intermediate steps of transition. Typically, a software vendor distributes an updated transition table 600 with each new release of the software. By doing so, an administrator is ensured of having the most up to date transition table 600 for transitioning among various release versions.

Figure 7:
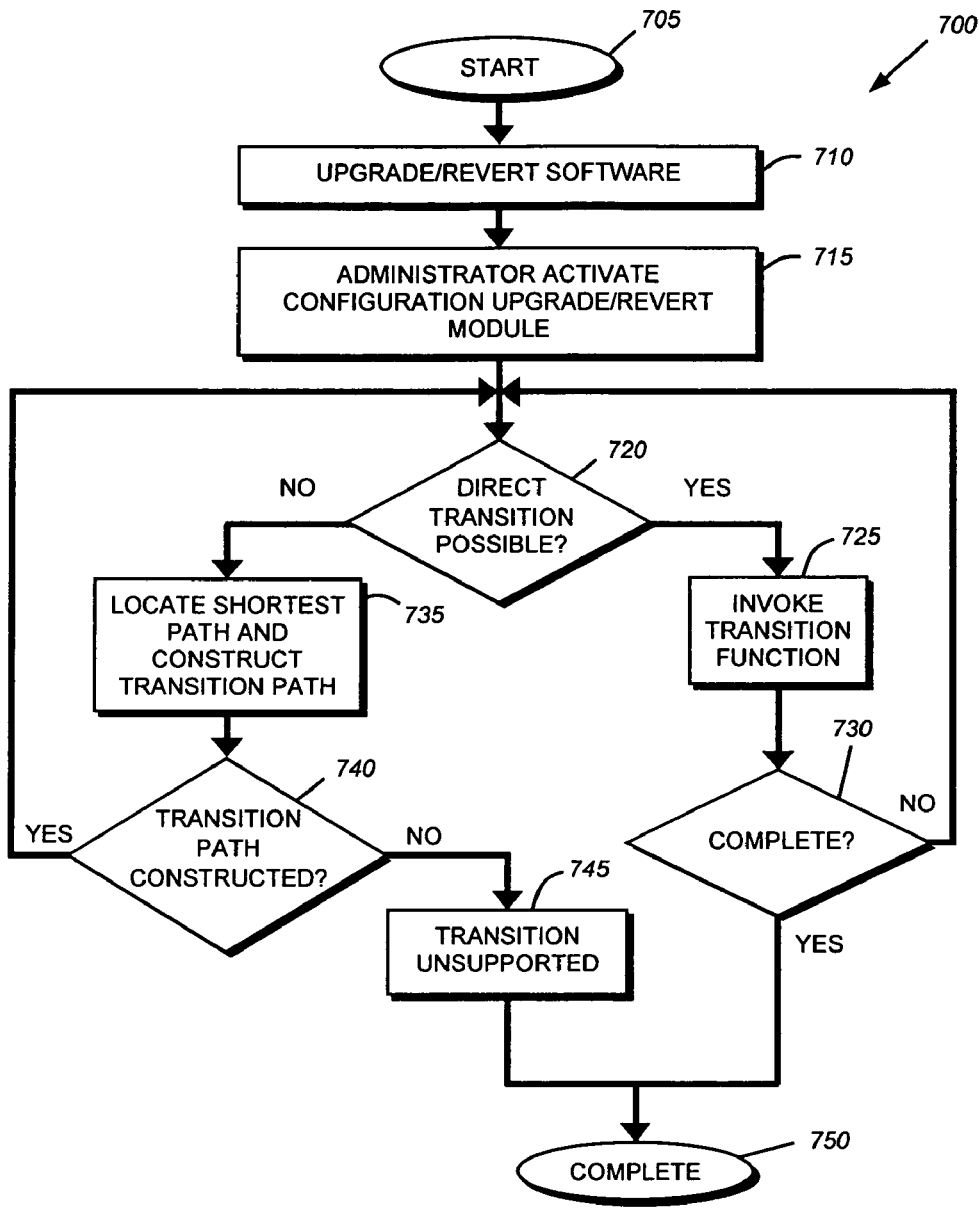
FIG. 7 is a flowchart detailing the steps of a procedure for upgrading/reverting configurations in accordance with an embodiment of the present invention.

FIG. 7 is a flowchart detailing the steps of a procedure 700 for performing upgrading/reversions of software configurations across a plurality of product release lines in accordance with an embodiment of the present invention. The procedure 700 begins in step 705 and continues to step 710 where an administrator upgrades/reverts the software, e.g., a storage generating system. The software upgrade/revert may be accomplished using any acceptable technique for modifying software versions. Once the software has been upgraded, the administrator activates the configuration module in step 715 using e.g., a CLI command or GUI. An exemplary GUI may be the Data Fabric Manager product available from Network Appliance, Inc. Alternately, the configuration module may be automatically invoked as part of the software upgrade/revert process.

Once invoked, the configuration module determines, whether a direct transition is possible between the initial release version and the desired end release version in step 720. For example, using illustrative transition table 600, a configuration transition from release X.Y to X+1.Y is possible using a direct (one step) transition. If such a transition is possible, the configuration module branches to step 725 and invokes the identified transition function from transition table 600. As noted above, a transition function identifies all information necessary to transition from a starting release version configuration to an ending release version configuration.

In step 730, the configuration module determines whether the transition has been completed to the desired end release version, by comparing the desired end release version with the ending version of the last transition function. If so, the procedure completes in step 750; otherwise, the procedure loops back to step 720 where the configuration module determines if there is a direct transition possible from the current release version to the desired end release version.

If, in step 720, it is determined that a direct transition is not possible, then the procedure branches to step 735 where the configuration module locates a shortest path between the initial and ending version configurations and constructs a transition path. Illustratively, the shortest path is found using a shortest path algorithm such as, e.g., the well-known Dijkstra algorithm. However, it should be noted that other techniques for finding the shortest path may be utilized. The shortest path operates on the transition table in terms of a graph, such as that shown in FIG. 5. The transition path identifies the order of transitions to be performed from the initial state to the desired end state. In step 740, a determination is made whether a transition path is able to be constructed. If not, the procedure branches to step 745 where the configuration module labels the transition as unsupported before completing in step 750.

If a transition path is able to be constructed, then the procedure branches to step 720 where the configuration module determines if there is a direct transition possible between the current state and the next state in the transition path. The procedure then continues by the configuration module iteratively executing the next transition function in the shortest path to reach the desired end release version configuration.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for automatically upgrading/reverting a version of a configuration associated with software executing on a storage system, the method comprising:
   determining whether a direct transition is possible from an initial state of configuration associated with the software and an end state of configuration associated with the software;
   in response to determining that a direct transition is not possible, identifying a shortest path, the shortest path determined by referencing transmission information contained in a data structure embodied on a matrix, the matrix containing a plurality of predetermined transition information structures, wherein each of said plurality of transition information structures represent a transition path including the shortest path, indicating the shortest transition path for the initial state of the configuration and the end state of the configuration associated with the software; and
   constructing a transition path associated with the identified shortest path from the data structure.

2. The method of claim 1 wherein the shortest path is identified using a transition table.

3. The method of claim 2 wherein the transition table comprises one or more transition functions.

4. The method of claim 1 further comprising:
   invoking one or more transition functions associated with the identified shortest path.

5. The method of claim 4 wherein the transition function modifies a configuration for the configuration associated with the software from a current version to a new version of the software.

6. The method of claim 1 further comprising:
   in response to determining that a direct transition is possible invoking a transition function to transition from the initial state to the end state.

7. The method of claim 1 wherein the software comprises a storage operating system having a plurality of release lines.

8. A system for automatically upgrading/reverting a version of a configuration associated with software, the system comprising:
   means for determining whether a direct transition is possible from an initial state of configuration associated with the software and an end state of configuration associated with the software;
   in response to determining that a direct transition is not possible, means for identifying a shortest path, the shortest path determined by referencing transmission information contained in a data structure embodied on a matrix, the matrix containing a plurality of predetermined transition information structures, wherein each of said plurality of transition information structures represent a transition path including the shortest path, indicating the shortest transition path for the initial state of the configuration and the end state of the configuration associated with the software; and
   means for constructing a transition path associated with the identified shortest path from the data structure.

9. The system of claim 8 wherein the shortest path is identified using a transition table.

10. The system of claim 8 wherein the transition table contains a plurality of transition functions.

11. The system of claim 10 wherein each of the transition functions identifies a set of changes to be performed on between a first and second state of the configuration associated with the software.

12. The system of claim 8 wherein the software comprises a storage operating system having a plurality of release lines.

13. The system of claim 8 further comprising:
   means for, in response to determining that a direct transition is possible, invoking a transition function to transition from the initial state to the end state.

14. A system for automatically upgrading/reverting a version of a configuration associated with software, the system comprising:
   a processor executing a process to automatically transition between a plurality of versions associated with software;
   a storage system management module implemented by the processor, the storage management module including:
   a configuration upgrade/revert module configured to locate a shortest path between an initial state of configuration associated with the software and an end state of the configuration associated with the software using a transmission information contained in a data structure embodied on a matrix, the matrix containing a plurality of predetermined transition information structures, wherein each of said plurality of transition information structures represent a transition path including the shortest path, indicating the shortest transition path for the initial state of the configuration and the end state of the configuration associated with the software.

15. The system of claim 14 wherein the transition table is stored in the storage system management module.

16. The system of claim 14 wherein the transition table comprises a plurality of transition functions.

17. The system of claim 14 wherein the each of the transition functions identifies a set of changes be performed to transition from a first version to a second version of the configuration associated with the software.

18. The system of claim 14 wherein the configuration upgrade/revert module is further configured to:
   determine if a direct transition is possible between the initial state and the end state.

19. The system of claim 18 wherein the configuration upgrade/revert module is further configured to:
   in response to determining that a direct transition is possible between the initial state and the end state, to invoke a transition function between the initial state and the end state.

20. The system of claim 14 wherein the software comprises a storage operating system.

* * * * *

UNITED STATES PATENT AND TRADEMARK OFFICE
CERTIFICATE OF CORRECTION

PATENT NO. : 7,565,519 B1
APPLICATION NO. : 11/388106
DATED : July 21, 2009
INVENTOR(S) : Ravindra Kumar It is certified that error appears in the above-identified patent and that said Letters Patent is hereby corrected as shown below:

Col. 1, Line 25, delete "is"

Col. 5, Line 34, delete "is"

Col. 13, Line 10, should read
-- initial state of a configuration associated with the software --

Col. 13, Line 11, should read
-- and an end state of the configuration associated with the --

Col. 13, Line 47, should read
-- from an initial state of a configuration associated --

Col. 13, Line 48, should read
-- with the software and an end state of the configuration --

Col. 14, Line 27, should read
-- a shortest path between an initial state of a configuration --

Signed and Sealed this

Fifteenth Day of September, 2009

David J. Kappos
*Director of the United States Patent and Trademark Office*